Patented Jan. 8, 1952

2,581,852

UNITED STATES PATENT OFFICE 2,581,852

HERBICIDE

Everett E. Gilbert, Flushing, N. Y., assignor to Allied Chemical & Dye Corporation, New York, N. Y., a corporation of New York No Drawing. Application May 18, 1950,
Serial No. 162,827

7 Claims. (Cl. 71—2.3)

This invention relates to a method for controlling plant life and particularly to a method for eradication of undesired vegetation.

Prior art herbicides are generally more or less selective and limited in their action. Some are best suited to control of weeds on agricultural lands where damage to crops must be avoided. The sulfamates are selective with respect to poison ivy but offer no special advantage for combatting other types of weeds. Hence, in order to formulate "all purpose" herbicides it has heretofore generally been necessary to combine several herbicidal ingredients, each ingredient being designed to kill a particular type of plant.

Many of the broad leaf or dicotyledonous varieties of plants which commonly grow wild in open fields, along railroad tracks, roads and fringes of woodland, may be controlled to some extent by herbicides previously known and now on the market. However, considerable difficulty is characteristic of destruction of the more pernicious monocotyledonous plants or grasses such as buffalo grass and wire grass which also commonly appear in the above designated typical areas. It is also relatively easy to destroy the aerial portion of weeds and other plants because such portion comes into direct contact with the herbicide. But achieving lethal effect on the subterranean roots which may be buried several inches or even a foot or more below the surface of the ground is usually quite difficult and often not practicable even in the case of the commonly more susceptible dicotyledonous varieties. Destruction of the roots is important in preventing re-sprouting of the root nodes after the herbicide has been washed away by rainfall or otherwise dissipated. Furthermore, even using the more potent of the prior art herbicides, substantial destruction of weed seeds which are embedded in the soil is not usually obtained. In much the same manner as the nodes on the live roots, such seeds which survive initial treatment usually sprout after the herbicidal effect has been dissipated and atmospheric conditions are favorable. In order to obtain soil "sterilization," i. e. substantially complete and long-lasting plant control with ordinary herbicides, use of excessive amounts of herbicide has been necessary. For example, common salt will produce soil sterilization but only in extremely high dosages which are too costly. Hence, one object of this invention is to develop an advantageous method for controlling plant life in a given area by means of which extensive and long-lasting control of plant life may be realized, e. g. killing of plant roots and, for a prolonged period of time after original application, killing of seedlings at or just after sprouting of the seeds, particularly in the case of the more refractory monocotyledonous varieties of plants.

According to my invention, the above objects may be obtained by applying to a given area in which it is desired to control plant life the benzyl ester of trichloroacetic acid. This herbicide of the present invention, which may contain only the designated single active ingredient, kills weed roots at substantial depths below the ground surface, kills or seriously inhibits growth of seedlings and is generally characterized by complete and long-lasting phytotoxic action.

Benzyl trichloroacetate, under normal temperatures, is a liquid. Accordingly, in conceivable, but less preferred embodiments of the invention it may be applied directly, as by spraying, to the vegetation to be treated. However, for reasons of economy and to achieve greater uniformity of application, it is preferred to disperse the ester in a suitable dispersion medium prior to application. Since the ester is soluble in many organic solvents such as hydrocarbon oils, but insoluble in water, I prefer to disperse said ester in a solvent organic material, e. g. a petroleum fuel oil. Such oil having a viscosity of about 40 Saybolt seconds at 100° F., a pour point of about 10° F. and a distillation range of about 10% over at 440° F. and 90% over at 600° F. has been found to be suitable. However, other hydrocarbon solvents may be utilized, primary considerations being solubility of the ester therein, economy and availability. If desired, organic solvents which are themselves herbicides may be employed. Other feasible methods of dispersing the herbicidal ester include first forming a solution thereof in suitable hydrocarbon or other organic solvent material and thereafter emulsifying said solution in water or aqueous medium with suitable emulsifying agent and possibly wetting agents. Alternative methods for dispersing the ester which may be mentioned include forming an emulsion of the ester directly with water or aqueous solution or suspending the ester on suitable solid powdered diluent. Any of the known types of spraying or dusting apparatus may be employed for applying the herbicidal composition to the area to be treated, a primary consideration being uniformity of application.

The concentration of the benzyl trichloroacetate in the dispersion medium is generally of secondary import and is maintained sufficiently high to bring about desired control of plant life.

If concentrations are exceedingly low, however, excessive volumes of herbicidal solution may be required to achieve desired plant-killing effect. The attendant disadvantage of possibly poor economy due to run-off and cost of dispersion medium is apparent, and affords a practical low limit on concentration of herbicide in the mixture. The benzyl ester employed in compounding the herbicidal mixture may be of technical or other relatively impure grade, but it is important to allow for relatively inert impurity content in determining amounts of components to give desired rate of application of active ingredient (benzyl ester) to the area being treated.

The herbicidal ester of my invention is applied to the area to be treated in amount (pounds per acre) sufficient to afford the degree of control of plant life desired in the given area, e. g., sufficient to destroy existing vegetation, kill roots and prevent sprouting of seeds. It will be appreciated that optimum intensity of application of the ester will depend upon many factors such as amount of vegetation in the area, degree of permanency of plant eradication desired, type (persistency) of plants growing in the area, as well as climatic conditions. Hence, the rate of application actually used will depend largely on local conditions prevailing. However, in most instances, effective prolonged eradication and control of plants of varieties commonly found may be realized by applying the ester at a rate greater than about 39 pounds per acre. For more permanent control or soil sterilization dosages of about 55 pounds per acre and above are utilized.

As indicated above, it is a specific advantage of the present invention that the said benzyl ester is particularly effective in controlling monocotyledonous plants, which plants are generally highly pernicious and refractory to ordinary herbicides. However, the benzyl ester is lethal also to dicotyledonous plants and accordingly, by use of the herbicidal ester of this invention, effective and permanent eradication of both mono- and dicotyledonous plants may be obtained.

The following example is illustrative of operations carried out in controlling plant life and eradicating weeds according to the process of the present invention. Parts and percentages are by weight:

The area chosen for conducting the experiment was heavily overgrown with buffalo grass, one of the panicum grasses. Interspersed in the panicum grass were secondary infestations of wire grass, horehound, poison ivy, wild blackberry (Rubus species), ragweed seedling and milkweed. The tests were conducted in New Jersey and the herbicides applied on June 18, at which time the weed growth was 16–18 inches high. Several plots, 5½ by 10 feet each, within this area were marked off with stakes and designated to be treated with particular herbicides. The herbicidal constituent of the mixture was dissolved in No. 2 Fuel Oil as dispersant (a standard type fuel oil having viscosity 40 Saybolt seconds at 100° F., distilling 10% over at 440° F. and 90% over at 600° F., a flash point 150° F. and a pour point of about 10° F.) and applied to the vegetation as uniformly as practicable as a fine (but not "atomized") spray using a standard type spraying apparatus. In the case of plots 1, 2 and 3 the herbicidal constituent of the oil spray solution was benzyl ester of trichloroacetic acid, and in the case of plot 4, for purpose of comparison with materials used for killing plants according to the prior art, the herbicide was trichloroacetic acid. For each of the four plots, herbicidal mixture was applied at a rate corresponding with 169 gallons per acre of oil dispersant.

| | Plot Number | | | |
|---|---|---|---|---|
| | 1 | 2 | 3 | 4 |
| Intensity of Application of Ester, Lbs. per Acre | 63 | 48 | 32 | |
| Equivalent Trichloroacetic Acid, Lbs. per Acre | 41 | 31 | 20 | 41 |

An inspection of the plots was made July 29 (41 days after treatment) and the following observations were made.

Plot No. 1.—There was substantially no evidence of vegetation. A few grass resprouts had appeared.

Plot No. 2.—About 90% of this plot showed no evidence of vegetation. Three wild blackberry and three goldenrod plants were alive.

Plot No. 3.—90% of the plot was devoid of vegetation and the plot was otherwise similar in appearance to plot No. 2.

Plot No. 4.—A few surviving plants remained. These plants were apparently unhealthy. The plot was rated about the same as No. 3.

A further inspection was made on September 3 (77 days after treatment), with observations as follows:

Plot No. 1 was substantially completely devoid of vegetation.

Plot No. 2.—Greater than 90% of the plot was devoid of vegetation. All plants that were alive were badly damaged.

Plot No. 3.—80% of the plot was devoid of vegetation. All plants that were alive were badly damaged.

Plot No. 4.—70–75% of the plot was devoid of vegetation. All plants that were alive were damaged.

Prior to September 3 and at the time of inspection, the growth on the untreated area surrounding the test plots was 30 to 36 inches high and of a density such that it was difficult to walk through the growth.

The plots were inspected June 5 of the following year. The areas surrounding the test plots were heavily overgrown to an average height of about 24 inches with grasses and weeds of the type previously described from observation at the time of original treatment. Observations of the test plots on June 5 are listed below.

Plot No. 1.—More than 60% of the plot area was barren. The living plants consisted of about four clumps of buffalo grass each of which was badly stunted, i. e. about one-fourth the height of the buffalo grass in the surrounding untreated area; one horehound plant which had badly stunted and malformed leaves, wiregrass plants which were in a stunted chlorotic condition covering about 5% of the plot area; and about a half dozen tiny grass seedlings about two inches high, the roots of which apparently had not penetrated deeply enough into the soil to contact residual herbicide in the subsurface areas. A few live blackberry roots were observed which had not resprouted in spite of the advanced stage of the season. There was no living poison ivy, ragweed or milkweed.

Plot No. 2.—There were a few barren spots and the remainder of the plot was covered to an average height of about 6 to 8 inches with buffalo grass, and some wiregrass and horehound interspersed therein.

Plot No. 3.—No barren spots appeared. The vegetation, predominantly buffalo grass and of a similar nature to that in plot 2 above, was about half to two-thirds of the height of the vegetation in the surrounding untreated areas.

*Plot No. 4.*—The regrowth of vegetation was somewhat reduced as compared with the surrounding area, but there were no barren spots.

The foregoing test demonstrates that the benzyl ester of trichloroacetic acid possesses markedly superior herbicidal and plant growth control properties as compared with trichloroacetic acid (for equal dosages based on equivalent pounds per acre of acid), that the ester is effective in combatting a wide variety of both mono- and dicotyledonous plants, in killing subterranean roots and even in preventing the growth of seedlings from seeds spread by the existing and previous generations of objectionable plants, and particularly that by using the ester as herbicide in suitable dosages substantially complete soil sterilization may be obtained with absence of any appreciable plant growth in the area treated a year after application.

I claim:

1. The method of destroying vegetation which comprises treating said vegetation with benzyl ester of trichloroacetic acid in amount sufficient to cause destruction of said vegetation.

2. The method of combatting growth of vegetation which comprises treating said vegetation with benzyl ester of trichloroacetic acid in amount sufficient to cause deterioration of said vegetation.

3. The method of combatting growth of vegetation which comprises applying to said vegetation benzyl ester of trichloroacetic acid in hydrocarbon oil solvent, the amount of said ester so applied being sufficient to cause deterioration of said vegetation.

4. The method of combatting growth of vegetation which comprises applying to said vegetation benzyl ester of trichloroacetic acid in petroleum oil solvent, the amount of said ester so applied and the concentration thereof in said solvent being sufficient to cause deterioration of said vegetation.

5. The method for destroying vegetation in a given area which comprises applying to said vegetation benzyl ester of trichloroacetic acid in amount greater than about 39 pounds per acre of said area, said benzyl ester being dispersed in a dispersion medium.

6. The method of destroying vegetation and obtaining prolonged control of plant life in a given area which comprises applying to said area benzyl ester of trichloroacetic acid in amount greater than about 55 pounds per acre, said benzyl ester being dispersed in a dispersion medium.

7. The method of combatting growth of vegetation which comprises applying to said vegetation benzyl ester of trichloroacetic acid dispersed in a dispersion medium, the amount of said ester so applied being sufficient to cause deterioration of said vegetation.

EVERETT E. GILBERT.

No references cited.